(12) United States Patent
Jo et al.

(10) Patent No.: US 11,429,016 B2
(45) Date of Patent: Aug. 30, 2022

(54) PROJECTION DEVICE

(71) Applicant: SEOUL NATIONAL UNIVERSITY R&DB FOUNDATION, Seoul (KR)

(72) Inventors: Young Jin Jo, Seoul (KR); Seung Jae Lee, Gyeonggi-do (KR); Dong Heon Yoo, Daejeon (KR); Byoung Ho Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/290,696

(22) PCT Filed: Oct. 31, 2019

(86) PCT No.: PCT/KR2019/014598
§ 371 (c)(1),
(2) Date: Apr. 30, 2021

(87) PCT Pub. No.: WO2020/091460
PCT Pub. Date: May 7, 2020

(65) Prior Publication Data
US 2022/0019138 A1    Jan. 20, 2022

(30) Foreign Application Priority Data
Nov. 1, 2018   (KR) .......................... 10-2018-0133148

(51) Int. Cl.
*G03B 21/14*   (2006.01)
*H04N 13/322*   (2018.01)
(Continued)

(52) U.S. Cl.
CPC ....... *G03B 21/2053* (2013.01); *G03B 21/142* (2013.01); *H04N 9/317* (2013.01);
(Continued)

(58) Field of Classification Search
CPC .. G03B 21/2053; G03B 21/14; G03B 21/145; G03B 21/147; G03B 21/142; H04N 13/32; H04N 13/322; H04N 13/363; G02B 30/36
See application file for complete search history.

(56) References Cited

U.S. PATENT DOCUMENTS

| | | |
|---|---|---|
| 9,395,546 B2 | 7/2016 | Kim et al. |
| 10,409,082 B2 | 9/2019 | Kilcher et al. |
| 10,469,833 B2 | 11/2019 | Hua et al. |

FOREIGN PATENT DOCUMENTS

| | | |
|---|---|---|
| JP | 2017-536570 A | 12/2017 |
| KR | 10-2011-0071389 A | 6/2011 |

(Continued)

OTHER PUBLICATIONS

KPO; Application No. PCT/KR2019/014598; International Search Report and Written Opinion dated Feb. 6, 2020.

*Primary Examiner* — Ryan D Howard
(74) *Attorney, Agent, or Firm* — Fitch, Even, Tabin & Flannery LLP

(57) ABSTRACT

The present disclosure relates to a projection device, and more particularly, to a projection device including: a projector module configured to provide an image to a screen; and a lens module between a user's eyes and the screen, wherein the project module includes: a display module configured to provide a certain image; and a backlight module configured to provide light to the display module such that the image provided by the display module is projected on the screen, wherein the display module is between the backlight module and the screen, the display module is configured to induce a convergence reaction on the user's eyes such that the image projected on the screen has a convergence distance, and the lens module is configured to induce a focus reaction on the user's eyes and change (Continued)

a focal length of the image reproduced by the display module within a certain range.

15 Claims, 5 Drawing Sheets

(51) Int. Cl.
    *G03B 21/20*     (2006.01)
    *H04N 13/32*     (2018.01)
    *H04N 13/363*     (2018.01)
    *H04N 13/398*     (2018.01)
    *H04N 9/31*     (2006.01)

(52) U.S. Cl.
    CPC ........... *H04N 13/32* (2018.05); *H04N 13/322* (2018.05); *H04N 13/363* (2018.05); *H04N 13/398* (2018.05)

(56) References Cited

FOREIGN PATENT DOCUMENTS

| | | |
|---|---|---|
| KR | 10-2012-0045565 A | 5/2012 |
| KR | 10-2014-0060204 A | 5/2014 |
| KR | 10-2016-0134714 A | 11/2016 |

PROJECTION DEVICE

CROSS-REFERENCE TO RELATED APPLICATIONS

This application is a U.S. national phase application filed under 35 U.S.C. § 371 of International Application No. PCT/KR2019/014598, filed Oct. 31, 2019, which is based upon and claims the benefit of priority from the prior Korean Application No. 10-2018-0133148, filed Nov. 1, 2018.

FIELD OF THE INVENTION

The present disclosure relates to a projection device, and more particularly, to a projection device including: a projector module configured to provide an image to a screen; and a lens module between a user's eyes and the screen, wherein the project module includes: a display module configured to provide a certain image; and a backlight module configured to provide light to the display module such that the image provided by the display module is projected on the screen, wherein the display module is between the backlight module and the screen, the display module is configured to induce a convergence reaction on the user's eyes such that the image projected on the screen has a convergence distance, and the lens module is configured to induce a focus reaction on the user's eyes and change a focal length of the image reproduced by the display module within a certain range.

BACKGROUND OF THE INVENTION

A common binocular display uses a method of displaying, to a user at a distant location, a virtual image of a common display panel. This kind of binocular display provides two different images to two eyes to induce a convergence reaction. For example, theaters use a passive stereo type method using two projectors, and in general homes, an active stereo type method in which a binocular display operates at 120 Hz and alternately provides an image to left/right eyes is used.

The binocular display provides an appropriate parallax according to a target depth to a virtual image shown to the two eyes, thereby inducing a convergence reaction from the user. On the contrary, each virtual image shown to a single eye is a two-dimensional image and does not have depth direction information, and therefore, no focus reaction of the user is induced. Therefore, a general binocular display using binocular parallax causes mismatch between a focal length and a convergence distance.

A convergence reaction corresponds to an angle of focusing directions of both eyes of the user, and a focus reaction corresponds to a lens thickness of each eye of the user. The two reactions involuntarily occur according to a location and a depth of an object viewed by the user, and are related to and reversibly affect each other. The lens thickness may be adjusted according to a depth sensed according to the convergence reaction, and an angle of both eyes may be adjusted according to a depth sensed according to the focus reaction. Accordingly, in a case where depths at which the two reactions are induced do not match each other, mismatch between the focal length and the convergence distance occurs, and thus, the convergence and focus of the user are continuously changed.

Mismatch between the focal length and the convergence distance is described below with reference to FIG. 1. A focal length N adjusted by a lens of an eye is adjusted to a screen on which an image is formed. However, due to a binocular parallax, an angle at which the two eyes view an object is formed at a distance far from the screen, and therefore, a convergence distance M and the focal length N do not match each other. When looking at a real object, no mismatch occurs between the focal length and the convergence distance. Due to technical properties, mismatch between the focal length and the convergence distance inevitably occurs, and therefore, the binocular parallax is considered as a major cause of eye fatigue, and studies are actively conductive on the binocular parallax.

To resolve the mismatch between the focal length and the convergence distance, a variable focus near-eye display capable of modulating a depth of a virtual image has been proposed. A most common method is to modulate a depth of a physical virtual image by adding a varifocal lens to a magnified optical system. This technology is characterized in displaying the virtual image at an appropriate depth according to viewing points of the user and minimizing mismatch between the focal length and the convergence distance.

The varifocal near-eyed display, which still displays a two-dimensional image, may not easily induce a complete focus reaction, and has technical difficulties in that a viewing point of the user needs to be accurately traced. To compensate for these technical difficulties, a method of appropriately and temporarily dividing images of various depths and showing the images at once is used, but this method causes degradation in resolution and frames. Considering that a common display that is currently used is driven at 60 Hz to 240 Hz, a related technology may be used to represent only up to four depths in a frame at 60 Hz. However, considering a wide focus range of the user, four depths are insufficient to resolve the mismatch between the focal length and the convergence distance. By performing image processing, each depth may have a depth expression range up to 0.6 diopter (in maximum, up to about 2.4 diopter). In this case, however, a resolution is degraded.

Therefore, a projection device capable of resolving the mismatch between the focal length and the convergence distance in a method different from the related art is required.

SUMMARY OF THE INVENTION

The present disclosure is devised to solve the above-stated shortcomings, and provides a projection device for resolving the mismatch between a focal length and a convergence distance. In detail, the present disclosure provides a projection device including: a projector module configured to provide an image to a screen; and a lens module between a user's eyes and the screen, wherein the project module includes: a display module configured to provide a certain image; and a backlight module configured to provide light to the display module such that the image provided by the display module is projected on the screen, wherein the display module is between the backlight module and the screen, the display module is configured to induce a convergence reaction on the user's eyes such that the image projected on the screen has a convergence distance, and the lens module is configured to induce a focus reaction on the user's eyes and change a focal length of the image reproduced by the display module within a certain range.

A projection device according to the present disclosure includes: a projector module configured to provide an image to a screen; and a lens module between a user's eyes and the screen, wherein the project module includes: a display module configured to provide a certain image; and a backlight module configured to provide light to the display module such that the image provided by the display module is projected on the screen, wherein the display module is between the backlight module and the screen, the display module is configured to a convergence reaction on the user's eyes such that the image projected on the screen has a convergence distance, and the lens module is configured to induce a focus reaction on the user's eyes and change a focal length of the image reproduced by the display module within a certain range.

According to an embodiment, the projection device further comprises a control device, and the control device is configured to synchronize an operation of the lens module with an operation of the backlight module, such that the convergence distance of the image provided by the display module and the focal length of the lens module match each other.

According to an embodiment, the control device, when the image provided by the display module has a focal length with a specific value due to the lens module, is further configured to operate the backlight module such that the backlight module provides light to the display module, thereby making the image provided by the display module be incident on the user's eyes with a specific focal length.

According to an embodiment, the image provided by the display module includes image data and depth distance data, and when the depth distance data provided by the display module and the focal length due to the lens module match, the backlight module is configured to provide light such that the focal length and the convergence distance match each other.

According to an embodiment, the backlight module includes a plurality of light emitting devices.

According to an embodiment, the plurality of light-emitting devices are arranged with a certain array behind the display module, and the control device is further configured to control each of the plurality of light-emitting devices to be binary-driven (on/off).

According to an embodiment, the backlight module includes a plurality of light source units and a mirror module configured to reflect light generated by the plurality of light source units and generate reflected light, wherein the control device is further configured to change an angle of the mirror module such that the reflected light is selectively incident on the display module.

According to an embodiment, the control device, when the convergence distance of the image reproduced by the display module and the focal length of the image due to the lens module match, is configured to make the reflected light, which is reflected by the mirror module, be incident on the display module.

According to an embodiment, the display module further comprises an optical module configured to make the reflected light, which is reflected by the mirror module, have a certain area.

According to an embodiment, the lens module includes a varifocal lens configured to linearly increase or decrease a focal length of the image generated by the display module within a certain sweep range during a certain time period.

According to an embodiment, the control device is further configured to shift the sweep range of the varifocal lens.

According to an embodiment, the backlight module is configured to operate to provide light to the display module when the image reproduced by the display module has a focal length equal to a certain value due to the lens module, such that the image reproduced by the display module is incident on the user's eyes with a certain focal length, the backlight module comprises a plurality of light-emitting devices arranged with a certain array behind the display module and a control device configured to control an operation of the plurality of light-emitting devices, wherein the control device is configured to control each of the plurality of light-emitting devices to be binary-driven (on/off), the plurality of light-emitting devices have a driving speed equal to N times per frame, and when the convergence distance of the image reproduced by the display module and the focal length of the image due to the lens module match, the control device is further configured to operate the plurality of light-emitting devices and provide light to the display module such that the focal length and the convergence distance match each other, and the lens module includes a varifocal lens configured to linearly increase or decrease the focal length of the image generated by the display module within a certain range, wherein the varifocal lens reciprocates within a certain depth per frame.

According to an embodiment, the one frame is equal to 1/60 seconds, and a binary-driving speed N of the plurality of light-emitting devices is equal to 100 times per frame.

According to an embodiment, the backlight module is configured to operate to provide light to the display module when the image reproduced by the display module is incident on the user's eyes with a certain focal length, and the backlight module comprises a plurality of light source units, a mirror module configured to reflect light generated from the plurality of light source units and generate reflected light, a collimating lens between the plurality of light source units and the mirror module and making the light generated by the plurality of light source units be incident on the mirror module with a certain area, and an optical module between the mirror module and the display module and making the reflected light reflected by the mirror module be incident on the display module with a certain area, wherein the mirror module comprises the mirror module and a controller configured to change an angle of the mirror module and make the reflected light be selectively incident on the display module, wherein the controller, when the convergence distance of the image reproduced by the display module and the focal length of the image due to the lens module match each other, makes the reflected light, which is reflected by the mirror module, be incident on the display module, the mirror module due to the controller has a driving speed of M times per frame, and the lens module includes a varifocal lens that linearly increases or decreases a focal length of the image generated by the display module in a certain range, wherein the varifocal lens reciprocates within a certain depth range once per frame.

According to an embodiment, one frame is equal to 1/60 seconds, and the driving speed M of the mirror module is equal to 100 times per frame.

In a projection device according to the present disclosure, when an image reproduced by the display module 110 has a focal length of a specific value by the lens module, a backlight module may provide light to the display module. Accordingly, the image generated by the display module may be formed on a screen with a specific focal length and be incident to the user's eyes T. In addition, when the lens module has another focal length, the light is not provided to the display module such that the image is not incident to the user's eyes T.

Therefore, the projection device according to the present disclosure may induce match between the convergence distance and the focal length of the image reproduced by the display module. That is, when the convergence distance induced by the display module and the focal length induced by the lens module match each other, the backlight module operates. Accordingly, the focal length and the convergence distance may be identical to each other. Accordingly, mismatch between the focal length and the convergence distance, which is a shortcoming of projection devices in the related art, may be resolved.

DETAILED DESCRIPTION OF THE PREFERRED EMBODIMENTS

A projection device according to the present disclosure includes: a projector module configured to provide a certain image to a screen; a lens module between a user's eyes and the screen, wherein the projector module includes: a display module configured to provide a certain image; and a backlight module configured to provide light to the display module such that the image provided by the display module is projected on the screen, wherein the display module is between the backlight module and the screen, and the display module is configured to induce a focus reaction to the user's eyes and change a focal length of the image reproduced by the certain module within a certain range.

Hereinafter, preferable embodiments according to the present disclosure will be described with reference to the accompanying drawings.

Figure 1:
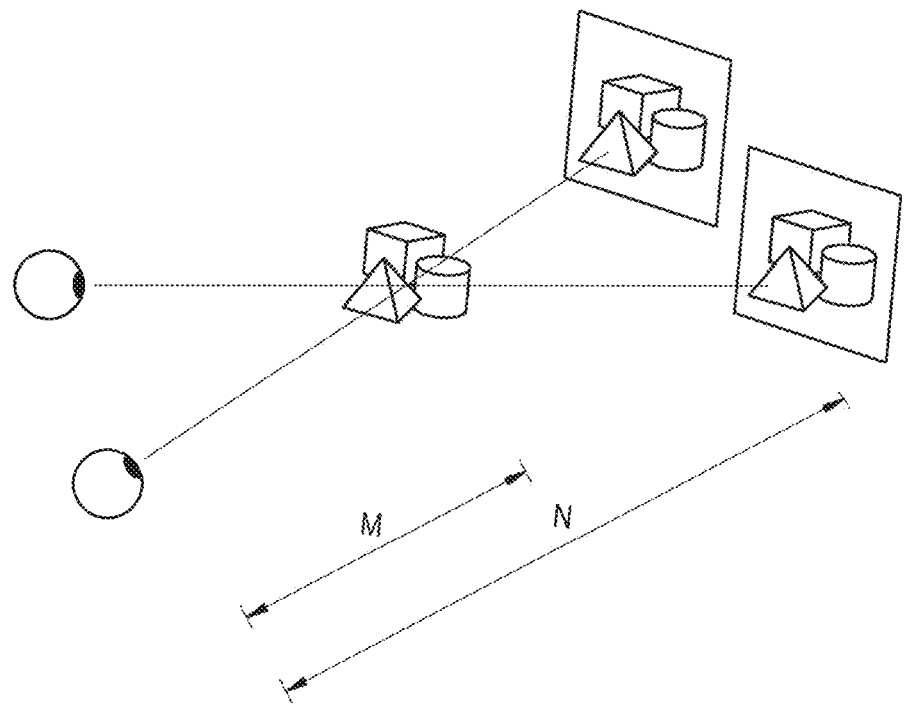
FIG. 1 is a conceptual diagram of a phenomenon of mismatch between a focal length and a convergence distance.
Figure 2:
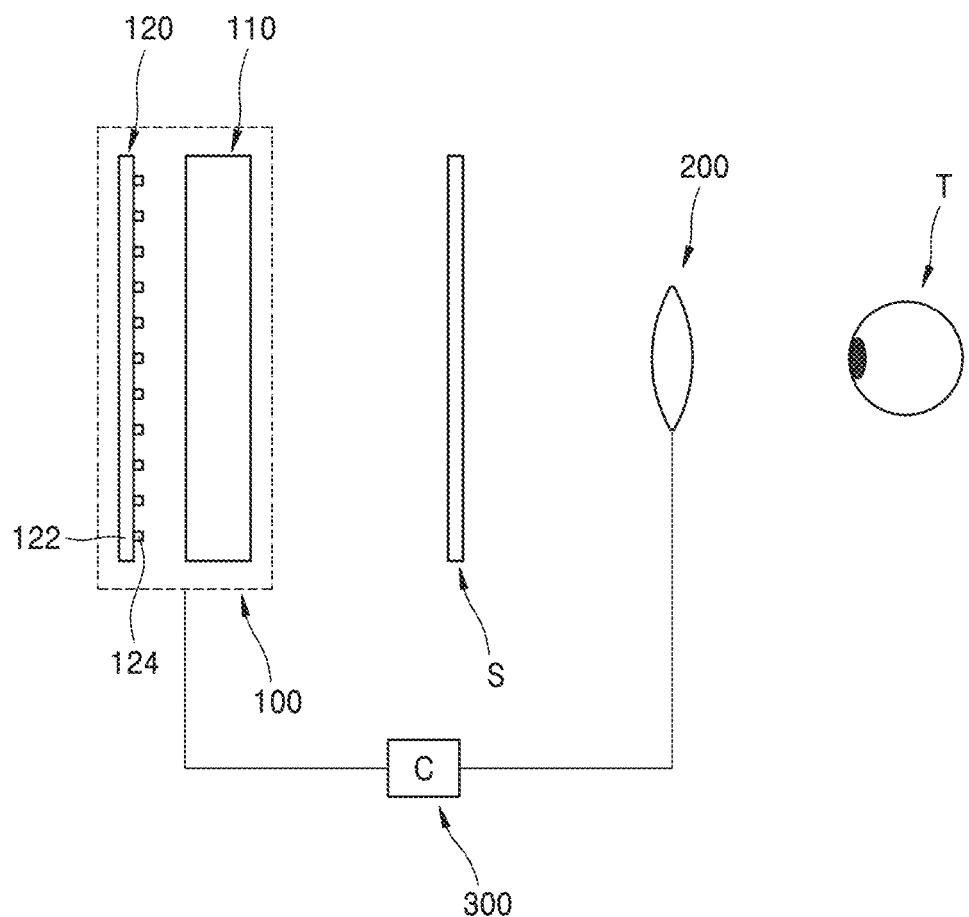
FIG. 2 is a diagram of a structure of a projection device according to an embodiment of the present disclosure.

FIG. 2 is a diagram of a structure of a projection device according to an embodiment of the present disclosure.

The projection device according to the present disclosure may be configured by including a projector module 100 and a lens module 200. Here, the projector module 110 may be configured by including a backlight module 120.

The projector module 100, which is a projection device, may be configured as a device providing an image to a screen S.

A display module 110 is a device providing an image. The display module 110 induces a convergence reaction to the eyes of the user. Therefore, an image reproduced by the display module 110 has a certain convergence distance and is projected on the user's eyes.

Related arts may be applied to a device and an operating method of inducing the convergence reaction. Devices and operating methods of the display module 110 inducing the convergence reaction may be different in various embodiments, and are not limited to specific methods and devices.

For example, the display module 110 may induce the convergence reaction by respectively providing different images to both eyes of the user.

For example, when three-dimensional glasses are used, a binocular parallax and a convergence reaction may be induced by separating an image projected on the screen and providing images respectively having different colors to left eye and right eye.

The backlight module 120 is behind the display module 110. That is, the display module 110 is between the screen S and the backlight module 120. The backlight module 120 provides light to the display module 110 such that the image provided by the display module 110 is projected on the screen S.

Referring to FIG. 2, the backlight module 120 of the projection device according to an embodiment of the present disclosure may include a printed circuit board (PCB) 122 and a plurality of light-emitting diodes 124 mounted on the PCB 122.

The PCB 122 is behind the display module 110, and the light-emitting device 124 is mounted on the PCB 122 and may irradiate light toward the display module 110. A plurality of the light-emitting device 124 may be mounted on the PCB with a certain array form. That is, a certain number of light emitting devices 124 may be in a certain unit area, for example, one light-emitting device 124 may be in one pixel.

The lens module 200 is between the user's eyes T and the screen S.

The lens module 200 induces a focus reaction to the user's eyes. By doing so, the image reproduced by the projector module 100 is projected on the user's eyes T with a certain focus distance. For example, the lens module 200 may be a device that is mounted on glasses worn by the user on the head.

The lens module 200 may change the focal length of the user's eyes T within a certain range. According to an embodiment, the lens module 200 may include a varifocal lens. Therefore, the lens module 200 may linearly increase or decrease the focus distance between the user's eyes T within a certain depth range.

For example, the varifocal lens may sweep the certain depth range sixty times during one second. Here, a 1/60 second may be one frame. Accordingly, a focal length by the varifocal lens may reciprocate the certain depth range once during one frame, and may also reciprocate the certain depth range sixty times for one second. For example, the focal length may be varied from minus diopter (a concave lens) to plus diopter (a convex lens) at a driving speed of 60 Hz. However, the driving speed of the varifocal lens is not necessarily limited to 60 Hz.

For example, the focal length of the varifocal lens may linearly increase from 50 mm to 120 mm for a 1/120 second, and may return to 50 mm for a 1/120 second. Here, a virtual image of the display module 110 formed by the varifocal lens may be swept within a range from ∞ to 8.5 cm. As the 1/60 second is a time period corresponding to one frame viewed by the user, the user may recognize images displayed for the 1/60 second as an image that is temporally summed.

The sweep range may have a shiftable configuration. For example, shift of the swipe range may be performed by a control device 300.

The varifocal lens may have an arbitrary configuration to change the focal length as described above. For example, the varifocal lens may have a configuration in which a position of the lens is linearly variable, a configuration in which a thickness of the lens is variable, a configuration in which a plurality of lenses are provided and distances between the lens are variable, and the like.

However, the varifocal lens is not limited to the above-stated examples, and a specific optical system or physical system that may perform the above-stated functions may substitute the above-stated forms. In addition, the varifocal lens may be replaced with another variable focus optical system for a field of view, an eye-box, and the like. For example, there may be a method of placing the varifocal lens in a relay optical system.

The control device 300 may control operations of the projector module 100 and the lens module 200.

First, the control device 300 may control each of the light-emitting devices 124 to be binary-driven (on and off). Accordingly, the control device may control each of the light-emitting devices 124 to be on/off.

Accordingly, when the light-emitting device 124 in a specific pixel is off, an image of a pixel of the display module 110 at a position corresponding to a position of the light-emitting device 124 is not incident to the user's eyes T. In addition, when the light-emitting device 124 at a specific position is on, the image of the pixel of the display module 110 at the position corresponding to the position of the light-emitting device 124 is incident to the user's eyes T.

In addition, the control device 300 may control each of the light-emitting devices 124 to be on/off at a specific time point. That is, the image of the display module 110 is incident to the user's eyes T at a time point where the light-emitting device 124 is on, and is not incident to the user's eyes T at a time point where the light-emitting device 124 is off.

According to an embodiment, a binary driving speed of the light-emitting device 124 by the control device 300 may have a speed of 60 Hz or greater. That is, the light-emitting device 124 may be on/off several times in one frame, and spatial modulation by on/off operations may be performed. For example, assuming that a spatial modulation reaction speed (a speed at which the control device 300 controls the light-emitting device 124 to be on/off) of the backlight module 120 is 1/6000 second (6000 Hz), spatial modulation by each of the light-emitting device 124 may be performed one hundred times in a frame. That is, the light-emitting device 124 may be on/off six thousand times a second, but is not limited thereto.

In addition, the control device 300 may change the focal length by controlling the operation of the lens module 200. That is, the lens module 200 includes a varifocal lens that linearly increases or reduces the focal length of the user's eyes T in the certain depth range, and the control device 300 may control an operation of the varifocal lens.

Operation examples of the projector module 100, the lens module 200, and the control device 300 are described as below. For example, the focal length generated by the varifocal lens may reciprocate the certain depth range once during one frame. In this case, the backlight module 120 provides light when the image of the display module 110 has a specific focal length by the varifocal lens, such that an image provided by the display module 110 may be incident to the user's eyes T with a specific focal length. In this case, a time point at which the backlight module 120 provides light may be set as a time point at which a focal length due to the varifocal lens and a convergence distance of the display module 110 match each other. Accordingly, an image having the focal length and the convergence distance match each other may be provided to the user. That is, mismatch between the convergence distance and the focal length may be resolved.

By the control device 300, the operation of the lens module 200 and the operation of the light-emitting device 124 may be synchronized with each other. For example, when the convergence distance due to the image provided by the display module 110 and the focal length of the image provided by the lens module 200 match, the control device 300 may operate to provide light to the display module 110.

For example, the image reproduced by the display module 110 may have certain image data and convergence distance data. Accordingly, when the convergence distance of the image stored in the display module 110 and the focal length provided by the lens module 200 match, the control device 300 may operate such that the light-emitting device 124 provides light. Accordingly, the control device 300 may include a certain control algorithm. That is, in the control device, when the lens module 200 has a specific focal length, the control algorithm in the control device 300 may operate the light-emitting device.

In addition, the control device 300 may shift the sweep range of the varifocal lens of the lens module 200. For example, there is possibility of distortion in an image depth according to viewing positions of the user, and the control device 300 may prevent the distortion in the image depth by shifting the sweep range of the lens module 200 according to the viewing positions of the user. The control device 300 may include an algorithm performing the shift of the sweep range of the lens module 200.

Figure 3:
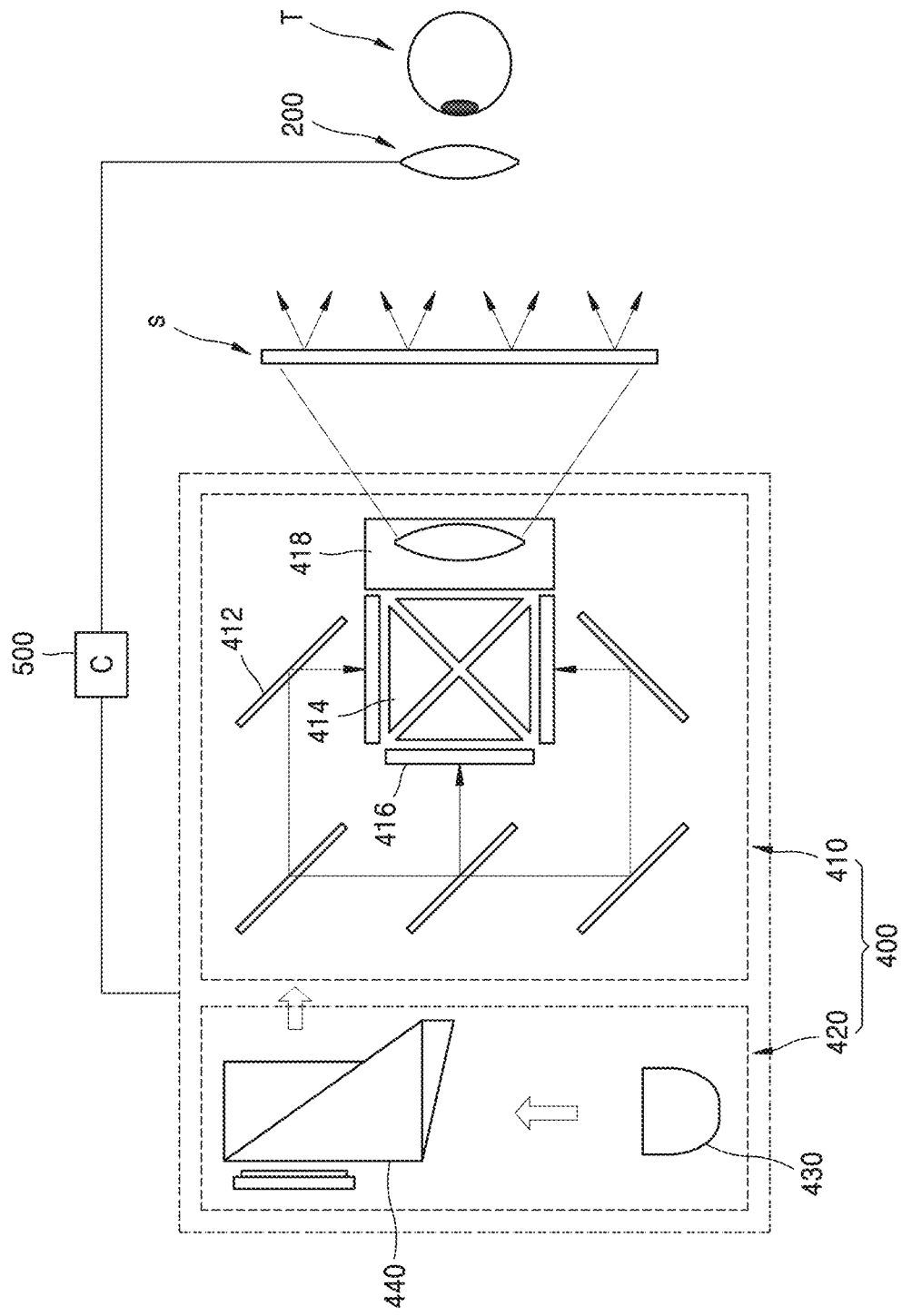
FIG. 3 is a diagram of a structure of a projection device according to an embodiment of the present disclosure.

FIG. 3 is a diagram of a structure of the projection device according to an embodiment of the present disclosure. In the present embodiment, the lens module 200 is the same as described above, and only a projector module 400 and a control device 500 have different configurations. Therefore, repeated descriptions are omitted, and the projector module 400 and the control device 500 will be described.

A projector module 400 of the projection device according to an embodiment of the inventive concept includes a display module 410 and a backlight module 420.

In this case, the display module 410 may be configured by including a projection member to be suitable for projection of images. For example, the display module 410 may be configured by including an optical module including a mirror 412, a prism 414, a liquid crystal display (LCD) 416, and a projector 418. In addition, the optical module may include various devices such as a collimating lens, a relay optical system, and a prism module. The optical module may include a magnification and relay optical system. The magnification and relay optical system broadens an area of light provided by the mirror module and relays the light to a display surface. That is, by including the optical module including the relay optical system, DMD may be reproduced like being directly on a surface of the display module 410. In addition, when the optical module performs a magnifying function, a mirror module 440 of the backlight module 420 may function like a backlight greater than an actual size of DMD (one inch). The above-stated components may be projection devices according to the related art, and detailed descriptions thereof are omitted.

The backlight module 420 may include a light source unit 430 and a mirror module 440.

The light source unit 430 may be at a position in the backlight module 420. The light source 430 may be configured by including a printed circuit board (PCB) and a light-emitting device. According to an embodiment, the light source unit 430 may be at one side of the backlight unit 420 and irradiate light in a direction.

The mirror module 440 reflects the light generated by the light source unit 430 and provides the light to the display module 410. The mirror module 440 may include a plurality of mirror devices that reflect light and having variable orientation angles. Operations of the mirror module 440 may be controlled by the control device 500, or a controller configured to control an orientation angle of the mirror module 440 may be separately provided. The mirror module 440 may be arranged in a certain array form. That is, a certain number of mirror modules 440 may be arranged in a certain unit area. That is, one mirror module 440 may be in each pixel. In addition, the control device 500 may control the orientation angle of each of the mirror modules 440.

For example, the mirror module 440 may be configured as a compact digital mirror device (DMD).

According to an embodiment, a driving speed of the mirror module 440 by the control device 500 or the controller may have a speed of 60 Hz or greater. That is, several times of operations are available in one frame, and spatial modulation may be performed by the operations. For example, when it is assumed that a modulation reaction speed of the mirror module is 1/6000 sec (6000 Hz), each of the compact DMDs may perform modulation one hundred times for each frame.

Detailed description of the spatial modulation is as follows.

The lens module 200 configured by the varifocal lens may scan the certain depth range sixty times during one second. It is assumed that the varifocal lens repeats the scanning of the certain depth range, and an appropriate image is reproduced at 60 Hz in the display module 410. In this case, during a 1/60 second, that is, in a frame, the varifocal lens reciprocates once the certain depth range, and a pause image is reproduced by the display module 410. In a case where the backlight module 420 provides the light to every pixel at a fixed value, the pause image is equally viewed at every depth. On the contrary, in the projection device according to the present disclosure, the backlight module 420 operates several times during one frame, and the light may be provided only at specific time points. Accordingly, in a case where the varifocal lens reaches a certain depth and the backlight module 420 is on, an image at a corresponding depth is provided to the user. In this case, while the varifocal lens reciprocates once in the depth range, the backlight module 420 may be on/off hundred times. Accordingly, by dividing a reciprocation distance of the varifocal lens into one hundred depths, the light may be provided at a specific depth among the one hundred depths.

Accordingly, when one hundred times of spatial modulation may be performed, it means that the backlight module 420 may be provide light by dividing the depth in which the varifocal lens reciprocates by one hundred depths. By providing light to a corresponding pixel at a certain depth, the focus reaction may be accurately given.

However, the number of times of spatial modulation is not limited thereto. For example, according to modulation reaction speeds of the backlight module 420 and the mirror module 440, one hundred times or more or less of spatial modulation may be performed during one frame (1/60 second). For example, assuming that the projection device enables two hundred times of spatial modulation during one frame and the varifocal lens reciprocates a certain depth range once per frame, the backlight module 420 may have two hundred times of on/off counts per frame. A driving speed of the mirror module 440 may also be two hundred times per frame.

In addition, a standard period per frame (a 1/60 second) is also a variable concept and is not limited. For example, assuming that one frame is 1/120 second, the projection device may perform one hundred times of spatial modulation during one frame, and the varifocal lens reciprocates in the certain depth range once in one frame, the backlight module 420 may have one hundred on/off counts for one frame, and therefore, an on/off available count for a second of the backlight module 420 may be twelve thousand times. The driving speed of the mirror module 440 may also be twelve thousand times for a second. That is, when the varifocal lens reciprocates once during one frame, on/off counts N for one frame of the backlight module 420 and a driving count M for one frame of the mirror module 440 are identical to a spatial modulation count Q for one frame of a target projection device.

Here, assuming that one frame is 1/60 second, the on/off count for one frame of the backlight module 420 and the driving count per second of the mirror module 440 may be obtained by multiplying 60 to the M and N values derived above.

Operations of the backlight module 420 according to the embodiments are described as follows.

The light source unit 430 generates light and makes the light be incident to the mirror module 440.

The mirror module 440 may reflect the light generated from the light source unit 430 in a direction of the display module 410 or in another direction. Accordingly, the reflected light is selectively incident to the display module 410.

In addition, the light may penetrate through the display module 410, or may penetrate through the optical module in a process before being provided to the display module 410. In a process of penetrating through the optical module as described above, optical modulation of the light may be performed. For example, the light may be modulated to have an appropriate light distribution area, and the light modulated in this way may be provided to the display module 410.

When the mirror module 440 reflects the light generated by the light source unit 430 in the direction of the display module 410, the light is provided to the display module 410, an image is formed on the screen S and incident to the user's eyes T. In addition, when the mirror module 440 reflects the light generated by the light source unit 430 in another direction, the light is not provided to the display module 410, and therefore, the image is not formed on the screen S and not incident to the user's eyes T. Accordingly, an operation such as the on/off operation of the light source unit 430 may be embodied according to operation of the mirror module 440.

The control device 500 controls the lens module 200 and the projector module 400. When the convergence distance due to the image provided by the display module 410 and the focal length of the image provided by the lens module 200 are consistent, the control device 500 may be operated such that the backlight module 420 provides the light to the display module 410. In detail, regarding the light of the light source unit 430 included in the backlight module 420, when the convergence distance due to the image provided by the display module 410 and the focal length of the image due to the lens module 200 match, the control device 500 may control the mirror module 440 such that the light of the light source unit 430 is provided to the display module 410.

According to an embodiment, a driving speed of the mirror module 440 by the control device 500 may have a speed at 60 Hz or greater.

As described above, the lens module 200 is configured by the varifocal lens linearly increasing or decreasing the focal length between the user's eyes T in a certain depth range, and for example, a focal length generated by the varifocal lens may reciprocate in the depth range once during one frame. In addition, the control device 500 may make the image produced by the display module 410 incident to the user's eyes T with a particular focal length by operating the mirror module 440 such that the light of the light source unit 430 is provided to the display module 410 when the image of the display module 410 has a particular focal length due to the varifocal lens. Here, a time point at which the mirror module 420 provides the light of the light source unit 430 to the display module 410 may be a time point at which the focal length due to the varifocal lens and the convergence distance match. Accordingly, an image having the focal length and the convergence distance match each other may be provided to the user. That is, mismatch between the convergence distance and the focal length may be resolved.

According to an embodiment, by the control device 500, the operation of the lens module 200 and operation of the mirror module 440 may be synchronized with each other. For example, the control device 500 may be operated to provide the light to the display module 410 at a time point where the convergence distance due to the image reproduced by the display module 410 matches the focal length of the image provided by the lens module 200. Accordingly, the controller may include a certain control algorithm. That is, when the lens module 200 has a specific focal length, the control algorithm in the control device 400 may operate the light-emitting backlight module 420.

As in the embodiments described above, the image reproduced by the display module 410 may have certain image data and convergence distance data. Accordingly, the control device may operate such that the mirror module 440 provides the light to the display module when the convergence distance of the image stored in the display module and the focal length due to the lens module 200 are identical to each other. Accordingly, the control device 500 may include a certain control algorithm. That is, when the lens module 200 has a specific focal length, the control algorithm in the control device 500 may operate the mirror module 440 and provide light to the display module 410.

Accordingly, an image having the focal length and the convergence distance match each other may be provided to the user. That is, mismatch between the convergence distance and the focal length may be resolved.

In addition, the control device 500 may shift the sweep range of the varifocal lens of the lens module 200. The shift of the swipe range is as described in the embodiments.

Figure 4:
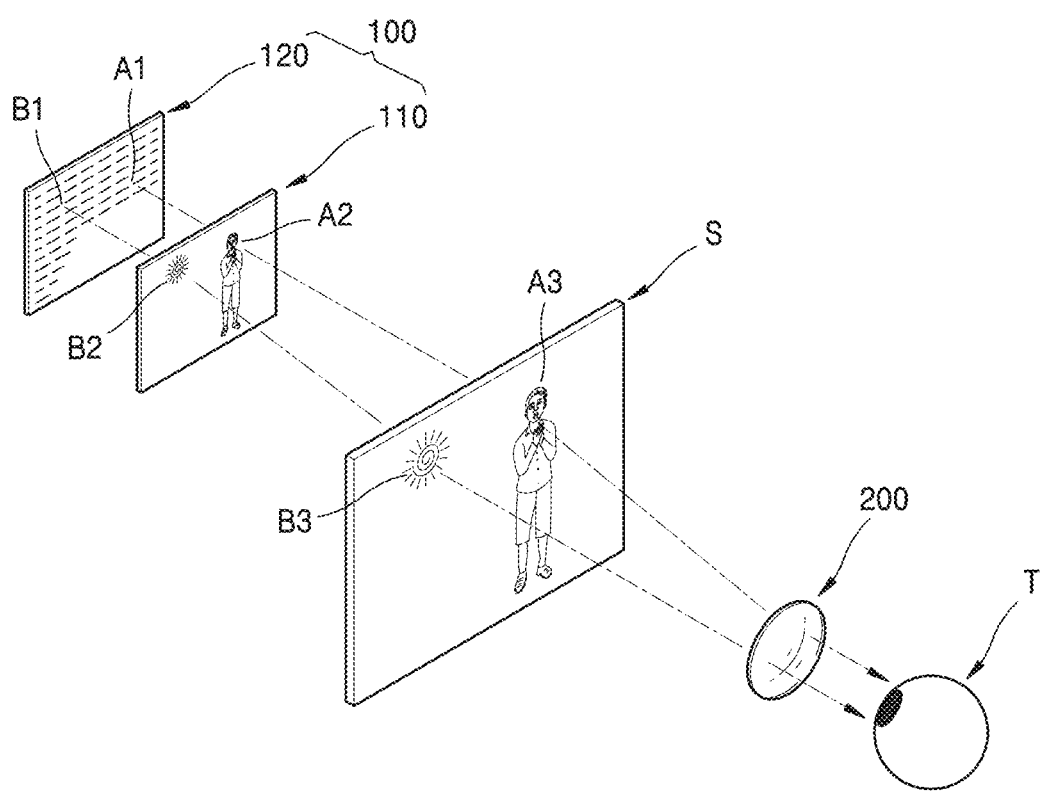
FIGS. 4 and 5 are diagrams showing operation examples of a projection device according to the present disclosure.

Referring to FIG. 4, operations of the projection device according to the present disclosure are described as follows. Here, for convenience, an operation of the backlight module 120 in the first embodiment is described.

A three-dimensional to be expressed by the display module 110 has a two-dimensional image and depth information for each frame. Here, the depth information indicates a convergence distance. An original image of the two-dimensional image is directly reproduced by the display module 110. The image is provided to the user with full brightness only when the backlight module 120 provides light. The depth information determines a depth at which the light emitting device 124 in each pixel of the backlight module 120 is turned on.

In a case where a depth to be represented by a pixel at A2 position of the image reproduced by the display module 110 is 1 m, when the lens module 200 embodies a 1 m focal length, the light emitting device 124 of at a pixel at A1 position of the backlight module 120, which corresponds to the pixel at the A2 position, provides light. In addition, in a case where a depth to be represented by a pixel at B2 position of the image reproduced by the display module 110 is 100 m, when the lens module 200 embodies a 100 m focal length, the light-emitting device 124 of a pixel at B1 position of the backlight module 120, which corresponds to the pixel at the B2 position, provides light. Accordingly, images each with an appropriate depth are formed at A3 and B3 positions of the screen S corresponding to the positions.

Figure 5:
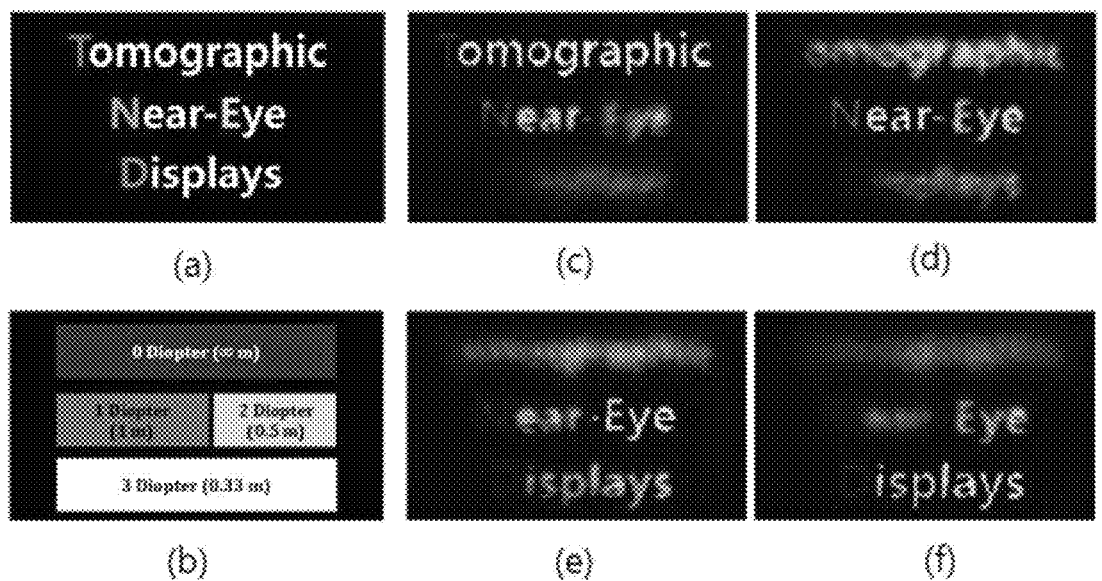

FIG. 5 is a diagram of an operation example of the present disclosure.

First, (a) is an image generated in the display module 110, and (b) is a depth information image of each region. As described above, the image generated by the display module has a two-dimensional image data and depth data (focal length data) in each region of the image data.

(C), (D), (E), and (F) respectively show a zero diopter focus, a one diopter focus, a two diopter focus, and a three diopter focus. The backlight module operates at a focal length matching the focal length data stored in each region, and the image of the display module is provided to the user.

Hereinafter, effects of the present disclosure are described.

In the projection device according to the present disclosure, when the image reproduced by the display module 110 has a focal length of a specific value by the lens module 200, the backlight module 120 provides light to the display module 110. Accordingly, the image generated by the display module 110 may be formed on the screen S with a specific focal length and be incident to the user's eyes T. In addition, when the lens module 200 has another focal length, the light is not provided to the display module 110 such that the image is not incident to the user's eyes T.

Therefore, the projection device according to the present disclosure may induce match between the convergence distance and the focal length of the image reproduced by the display module 110. That is, when the convergence distance induced by the display module 110 and the focal length induced by the lens module 200 are identical to each other, as the backlight module 120 operate, the focal length and the convergence distance may match. Accordingly, mismatch between the focal length and the convergence distance, which is a shortcoming of projection devices in the related art, may be resolved.

In addition, the projection device according to the present disclosure may represent one hundred or more depth based on a currently commercialized technology, and this allows complete resolution of mismatch between the focal length and the convergence distance.

In addition, in the projection device according to the present disclosure, a resolution loss may be prevented.

For example, in an existing display device that is not capable of solving mismatch between the focal length and the convergence distance, in an occasion of mismatch between the focal length and the convergence distance, considering "a case in which convergence matches but the focus does not match", an object that is to be clearly visible blurs, and this causes leads to loss of resolution. On the contrary, the technology in the present disclosure resolves mismatch between a focal length and a convergence distance, and therefore, there is no loss of resolution.

For another example, considering an existing focus-inducing display device configured to provide continuous focuses between two or more depth surfaces to the two or more depth surfaces so as to resolve mismatch between the focal length and the convergence distance, in this device, each of the depth surfaces has a certain depth difference, and a resolution is sacrificed to express focuses corresponding to a depth between the depth surfaces. On the contrary, the technology of the present disclosure may express a plurality of (one hundred or more) almost continuous surfaces, not a limited number of (two to four) depth surfaces, therefore, a depth difference between the surfaces is very small, and there is little loss of resolution. That is, unlike in an existing method having a limited number of depth expression, the projection device according to the present disclosure has little loss of resolution.

In addition, the projection device according to the present disclosure may calibrate a field distortion occurring in the optical system by using a degree of freedom in the depth direction. The field distortion indicates an optical aberration in which focal surface depths of images at an outer edge and a center portion are different from each other. The projection device according to the present disclosure may calculate and reflect a degree of the optical aberration in advance, and may calibrate the optical aberration. For example, when the focus surface is formed closer to a center portion than to the edge, the field distortion described above may be calibrated in the center portion by using a method of providing light when a display panel is in a greater distance.

In addition, the projection according to the present disclosure may prevent distortion of an image depth according to viewing positions by being configured to be capable of shifting the sweep range of the lens module 200.

Although desirable embodiments have been shown and described above, the present disclosure is not limited to particular embodiments. The present may be implemented in various modifications by those skilled in the art without departing from the point of the present disclosure in the following claims, and the modifications are not understood to be separate from the technical spirit or a prospect of the present disclosure.

The invention claimed is:

1. A projection device comprising:
a projector module configured to provide a certain image to a screen;
a lens module between a user's eyes and the screen,
wherein the projector module comprises
a display module configured to provide a certain image; and
a backlight module configured to provide light to the display module such that the image provided by the display module is projected on the screen,
wherein the display module is between the backlight module and the screen, and
the display module is configured to induce a convergence reaction on the user's eyes such that the image projected on the screen has a certain convergence distance, and
the lens module is configured to a focus reaction on the user's eyes and change a focal length of the image reproduced by the display module within a certain range.

2. The projection device of claim 1, further comprising:
a control device,
wherein the control device is configured to synchronize an operation of the lens module with an operation of the backlight module,
such that the convergence distance of the image provided by the display module
and the focal length of the lens module match each other.

3. The projection device of claim 2,
wherein the control device,
when the image provided by the display module has a focal length of a specific value by the lens module,
is further configured to operate the backlight module such that the backlight module provides light to the display module,
thereby making the image provided by the display module be incident on the user's eyes with a specific focal length.

4. The projection device of claim 2,
wherein the image provided by the display module includes image data and depth length data, and when the depth length data of the image provided by the display module and the focal length due to the lens module match each other,
the backlight module is further configured to provide light such that the focal length and the convergence distance match each other.

5. The projection device of claim 2, wherein the backlight module comprises a plurality of light-emitting devices.

6. The projection device of claim 5, wherein
the plurality of light-emitting devices are arranged with a certain array behind the display module, and
the control device is further configured to control each of the plurality of light-emitting devices to be binary-driven (on/off).

7. The projection device of claim 2, wherein the backlight module comprises
a plurality of light source units, and
a mirror module configured to reflect light generated from the plurality of light source units and generate reflected light,
wherein the control device is further configured to change an angle of the mirror module such that the reflected light is selectively incident on the display module.

8. The projection device of claim 7,
wherein the control device,
when the convergence distance of the image reproduced by the display module
and the focal length of the image due to the lens module match each other,
is further configured to make the reflected light, which is reflected by the mirror module, be incident on the display module.

9. The control device of claim 8, wherein the display module further comprises an optical module configured to make the reflected light reflected by the mirror module have a certain area.

10. The projection device of claim 2, wherein the lens module comprises a varifocal lens configured to linearly increase or decrease a focal length of the image produced by the display module within a certain sweep range during a certain time period.

11. The projection device of claim 10, wherein the control device is further configured to shift the sweep range of the varifocal lens.

12. The projection device of claim 1,
wherein the backlight module is further configured to
operate to provide light to the display module when the image reproduced by the display module has a focal length equal to a certain value due to the lens module, such that the image reproduced by the display module is incident on the user's eyes with a certain focal length, and
the backlight module comprises
a plurality of light-emitting devices arranged with a certain array behind the display module; and
a control device configured to control an operation of the plurality of light-emitting devices,
the control device is configured to
control each of the plurality of light-emitting devices to be binary-driven (on/off), wherein the plurality of light-emitting devices have a binary driving speed of N times per frame, and when the convergence distance of the image reproduced by the display module and the focal length of the image due to the lens module match each other, the control device is configured to operate the plurality of light-emitting devices and provide the light to the display module such that the focal length and the convergence distance match each other, and the lens module comprises a varifocal lens configured to linearly increase or decrease the focal length of the image produced by the display module within a certain range, wherein the varifocal lens reciprocates within a certain depth range once per frame.

13. The projection device of claim 12, wherein one frame is equal to 1/60 seconds, and and the binary driving speed N of the plurality of light-emitting device is equal to 100 times per frame.

14. The projection device of claim 1, wherein the backlight module is further configured to operate to provide light to the display module when the image reproduced by the display module has a focal length of a certain value due to the lens module, such that the image reproduced by the display module is incident on the user's eyes with a certain focal length, and the backlight module comprises a plurality of light source units, a mirror module configured to generate reflected light by reflecting light generated by the plurality of light source units, a collimating lens between the light source unit and the mirror module and configured to make the light produced by the light source unit be incident on the mirror module with a certain area, and an optical module between the mirror module and the display module and configured to make the reflected light reflected by the mirror module be incident on the display module with a certain area, wherein the mirror module comprises a mirror module and a controller configured to change an angle of the mirror module and makes the reflected light be selectively incident on the display module, wherein the controller, when the convergence distance of the image reproduced by the display module and the focal length of the image due to the lens module match each other, is configured to make the reflected light reflected by the mirror module be incident onto the display module, and the mirror module controlled by the controller has a driving speed of M times per frame, and the lens module comprises a varifocal lens that linearly increases or decreases a focal length of the image generated by the display module in a certain range, wherein the varifocal lens reciprocates within a certain depth range once per frame.

15. The projection device of claim 14, wherein one frame is equal to 1/60 seconds, and the driving speed M of the mirror module is equal to 100 times per frame.

* * * * *